(12) United States Patent
Shaffer et al.

(10) Patent No.: US 9,509,358 B1
(45) Date of Patent: Nov. 29, 2016

(54) BEHAVIOR ADAPTIVE BATTERY CONTROL SYSTEM FOR MOBILE DEVICE CASE

(71) Applicant: Alpha Audiotronics, Inc., New York, NY (US)

(72) Inventors: Jonathan Everett Shaffer, Huntingdon Valley, PA (US); Jamie Robert Seltzer, New York, NY (US)

(73) Assignee: ALPHA AUDIOTRONICS, INC., New York, NY (US)

( * ) Notice: Subject to any disclaimer, the term of this patent is extended or adjusted under 35 U.S.C. 154(b) by 0 days.

(21) Appl. No.: 14/845,927

(22) Filed: Sep. 4, 2015

(51) Int. Cl.
*H04W 52/02* (2009.01)
*H04B 1/3883* (2015.01)
*H04B 1/3888* (2015.01)

(52) U.S. Cl.
CPC .......... *H04B 1/3883* (2013.01); *H04B 1/3888* (2013.01)

(58) Field of Classification Search
CPC .... H02J 7/0052; H02J 7/0044; H02J 7/0045; H04M 1/0274
USPC .......... 455/95, 100, 572, 573, 575.1, 575.8, 455/343.1, 343.2, 343.6
See application file for complete search history.

(56) References Cited

U.S. PATENT DOCUMENTS

| | | | |
|---|---|---|---|
| 6,314,307 B1 * | 11/2001 | Charron | G06F 1/28 320/152 |
| 8,024,012 B2 * | 9/2011 | Clevenger | H02J 17/00 455/343.1 |
| 8,111,042 B2 * | 2/2012 | Bennett | G06Q 20/3674 307/149 |
| 8,390,255 B1 | 3/2013 | Fathollahi | |
| 8,868,796 B1 | 10/2014 | Wojcik et al. | |
| 9,069,047 B2 * | 6/2015 | Nallabelli | H02J 7/0047 |
| 2010/0134305 A1 | 6/2010 | Lu et al. | |
| 2013/0052871 A1 | 2/2013 | Eklind | |
| 2015/0194648 A1 * | 7/2015 | Fathollahi | H01M 2/1061 429/98 |
| 2015/0270734 A1 * | 9/2015 | Davison | H02J 7/0054 320/103 |
| 2015/0295446 A1 * | 10/2015 | Fathollahi | H02J 7/0045 455/573 |
| 2016/0043585 A1 * | 2/2016 | Zawadzki | H02J 7/0044 320/114 |

* cited by examiner

*Primary Examiner* — Cong Tran
(74) *Attorney, Agent, or Firm* — Fox Rothschild LLP

(57) ABSTRACT

A mobile electronic device automatically receives an electrical charge from a proximate case that is equipped with a backup battery for the mobile device. The mobile device executes programming instructions that instruct its processor, when the mobile device is positioned proximate to the case, to identify a first trigger value and monitor a parameter of the mobile device to determine when the parameter reaches the first trigger value. Upon determining that the parameter reaches the first trigger value, the mobile device issue a command to cause a controller of the case to cause the case battery to discharge energy to the mobile device. The mobile device may also identify a second trigger value and issue a command to cause the controller to cause the case battery to stop discharging energy to the mobile device when the second trigger value is reached.

46 Claims, 7 Drawing Sheets

BEHAVIOR ADAPTIVE BATTERY CONTROL SYSTEM FOR MOBILE DEVICE CASE

BACKGROUND

A typical mobile device case with embedded battery delivers charge to a mobile device when the two are connected and a physical switch on the mobile device case is triggered mechanically by a user. This mechanical switch causes the mobile device case battery to distribute energy to the mobile device which is electrically connected to the mobile device case battery. A physical switch can be accidentally activated; this is an inconvenience to users who want to preserve the mobile device case battery. Further, an unattended mobile device can fully deplete its battery and shut down even when the mobile device case battery is at full capacity and the mobile device and mobile device case with an integral battery are connected. A user who is not mindful of the mobile device battery status can run out of power if the user does not activate the mechanical switch on the mobile device case with integral battery.

SUMMARY

This document describes systems for, and methods of, charging a mobile electronic device. In an embodiment, the mobile device includes a processor, a non-transitory memory device, and a rechargeable mobile device battery. A case is configured to receive the mobile device and includes a rechargeable case battery, a controller, and programming instructions that are configured to instruct the mobile device processor, when the mobile device is positioned proximate to the case, to: identify a first trigger value; monitor a parameter of the mobile device to determine when the parameter reaches the first trigger value; and upon determining that the parameter reaches the first trigger value, issue a command to cause the controller of the case to cause the case battery to discharge energy to the mobile device battery.

The system also may be configured to identify a second trigger value and monitor the parameter of the mobile device to determine when the parameter reaches the second trigger value. When the system determines that the parameter reaches the second trigger value, it may issue a command to cause the controller of the case to cause the case battery to stop discharging energy to the mobile device battery.

Optionally, if the mobile device includes a battery level sensor, any of the trigger values and the respective parameters may each be associated with a battery level. If so, then each of the trigger values may be a threshold across which the battery level of the mobile device may equal or cross, indicating either a low battery level at or after which the battery should be charged, or a full battery level at or after which the battery is considered fully charged.

Optionally, if the mobile device includes a clock sensor, any of the trigger values and the respective parameters may each be associated with a start time and/or stop time. If so, then when the system, based on the clock sensor, determines that the start time has been reached, it may start a charging event. When the system determines that the stop time has been reached, it may stop the charging event.

Optionally, if the mobile device includes a touch-sensitive display device, the system may include programming instructions configured to instruct the device's processor to output, via the touch-sensitive display device, a user interface with input sectors that are configured to prompt a user to enter the first trigger value, and to receive the first trigger value in response to the prompt.

As another option, the system may include programming instructions that are configured to instruct a processor of the system to monitor a start time and a stop time, and/or or duration of, the case battery's charging events. If so, then the system may: (i) monitor one or more parameters of the mobile device that correspond to each monitored charging event; (ii) store the monitored start and stop times and/or durations, along with the corresponding parameters for each charging event in a computer-readable memory device; and (ii) use the monitored start and stop times and/or durations, and the corresponding parameters for each charging event, to determine the first trigger value.

If the mobile device includes a touch-sensitive display device, then the instructions also may be configured so that after determining the first trigger value, the system will cause the display device to: (a) output the determined first trigger value as a candidate trigger value; (b) output, via an input field sector of the touch-sensitive display device, a prompt configured to prompt a user to confirm or modify the candidate trigger value; and (c) use a user response to the prompt as the first trigger value by replacing the determined first trigger value with the received response.

DETAILED DESCRIPTION

Figure 1A:
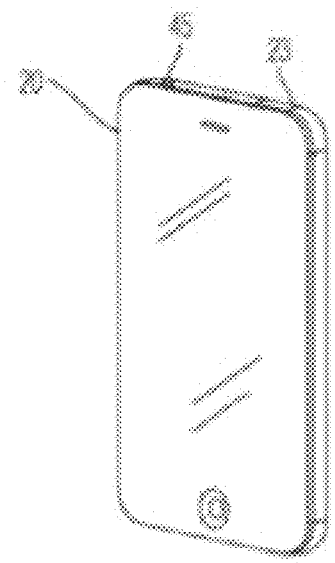
FIG. 1A is an example of a mobile device positioned within a case.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, the terms "mobile device" and "mobile electronic device" refer to a portable device that includes a processor, a display device and non-transitory, computer-readable memory. The memory may contain programming instructions in the form of a software application that are configured such that, when the processor executes the instructions, the processor will cause the device to perform one or more processing operations according to the programming instructions. Examples of mobile devices include smartphones, personal digital assistants, smartwatches, smartbands, cameras, tablet computing devices, fitness trackers, electronic readers, personal computers, media players, satellite navigation devices and the like.

This document describes various embodiments relating to the distribution of energy from a mobile device case with an integral battery to a mobile device via components of a mobile device that will control the case's electrical connection to the mobile device. The mobile device case does not require a mechanical switch to turn on and off. Instead, the embodiments described below allow a user to automate energy distribution to the mobile device from the case via software-based control of the case's internal battery and electronics.

A user, therefore does not need to manually activate energy transfer once the parameters of the control system are set by such user and/or otherwise gathered by the system. The system commands the case battery to distribute energy automatically, determined by the user-provided parameters and/or historic usage data for both the mobile device and mobile device case battery. The system may permit a user to set a trigger that corresponds to a percentage of mobile device battery life remaining so that when the mobile device battery's life reaches or passes the threshold, the system automatically commands the mobile device case's battery to distribute energy to the mobile device. The trigger may also be a time interval rather than battery percentage. In some embodiments, the user may also activate a function which monitors and records data on the user's charging patterns, and based on this date, which optimizes timing and duration energy distribution from the mobile device case battery to the mobile device. This adaptive charging function may reduce the number of battery charging cycles experienced by the batteries of both the mobile device and the mobile device case, thereby prolonging each battery's long-term battery life and capacity. Alternatively, the user can use a software-based digital switch which enables the application software to issue commands from the mobile device to the case in accordance with the position of the digital switch.

Figure 1B:
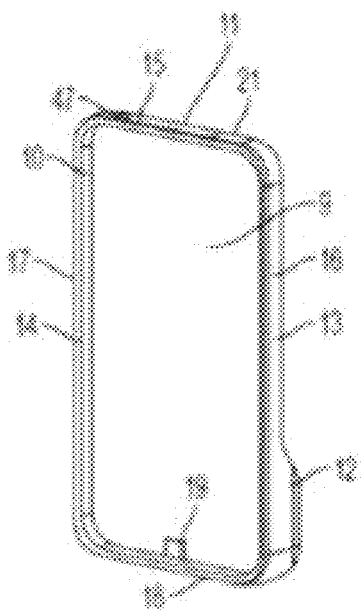
FIG. 1B is an example of a mobile device case with integral battery and the mobile device removed from the case.

FIG. 1A illustrates an example of a mobile device 20 positioned within a case. As seen in FIG. 1B, the mobile device case 11 comprises a base portion 12, four sidewalls 15-18, a bumper 13 that wraps around the sidewalls, and a plug 19 at the base for connecting the power port of a mobile electronic device to the case 11. The case 11 can be shaped to contain and protect a mobile device 20 (e.g., a smartphone). The mobile device fits snugly within the case, but a user has access to one or more buttons 23 that provide activating capability for functions such as volume control, a headphone jack 45, and a touch screen of the mobile device either directly or through apertures embedded within the case such as 21. Other case designs are possible.

Case 11 may be a single solid unit comprising four sidewalls 15-18, bumper portion 13 which runs along the exterior of the sidewalls, base portion 12 and a panel 9 that partially or fully covers a face of the mobile device, typically covering the rear face except for locations of one or more apertures that correspond to elements of the mobile device that provide audio, visual or haptic functions such as a camera, a speaker or microphone, a switch or other electrical components. In other embodiments, the case 11 may be divisible into two or more parts to ease connection of the case 11 to mobile device 20.

The housing may include a front aperture that allows a display of the mobile device to remain open for viewing and use. Similarly, any of the sidewalls may include one or more apertures 17 positioned to expose functional elements of the mobile device, such as a microphone, speakers or power switch.

Optionally, the case 11 may be made of a variety of materials, suited for various purposes. For example, the case 11 may be made of a material that is flexible and allows a mobile device to fit snugly within the case 11. The material may also be impact resistant to fracture when case 11 containing a mobile device 20 is dropped from a user's hand, a table, a desk or similar heights onto a variety of surfaces including concrete, asphalt, carpet, and the like. The case 11 may also be made of a material that can be produced in a variety of colors. For example, the case 11 can be made of a suitable material such as polycarbonate, polypropylene, polyvinyl chloride, photopolymer, resin, metal, alloy and the like and may be made by a suitable process such as injection molding.

Figure 1C:
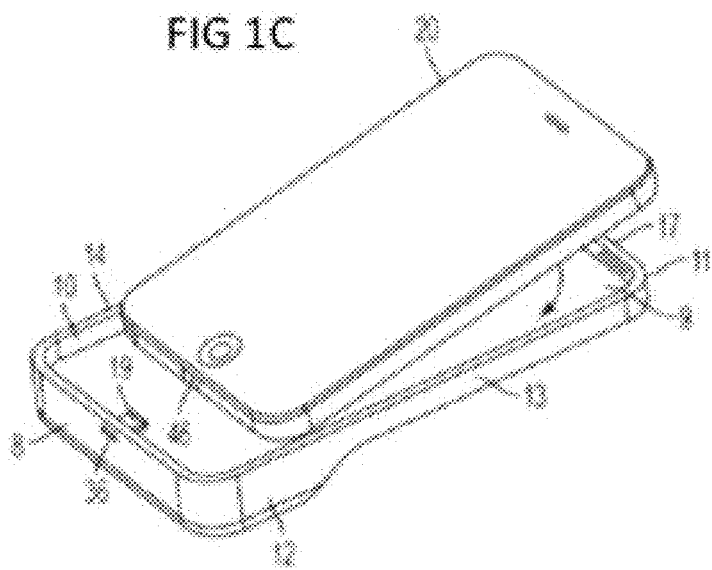
FIG. 1C shows the mobile device from FIG. 1A being inserted into the mobile device case from FIG. 1B.

As demonstrated in FIG. 1C, the user may attach the mobile device 20 to case 11 by aligning the mobile device with the base portion 12 and applying pressure to force plug 19 into the mobile device port jack 46. The mobile device 20 will directly contact the inner wall 10 of the case as well as back panel 9 and plug 19. At the bottom of base portion 12 is an aperture 36 to receive an electrical power cord. The plug 19 serves as port to transfer energy and data to the mobile device when the mobile device 20 is inserted into the case and connected to the plug 19.

Figure 2B:
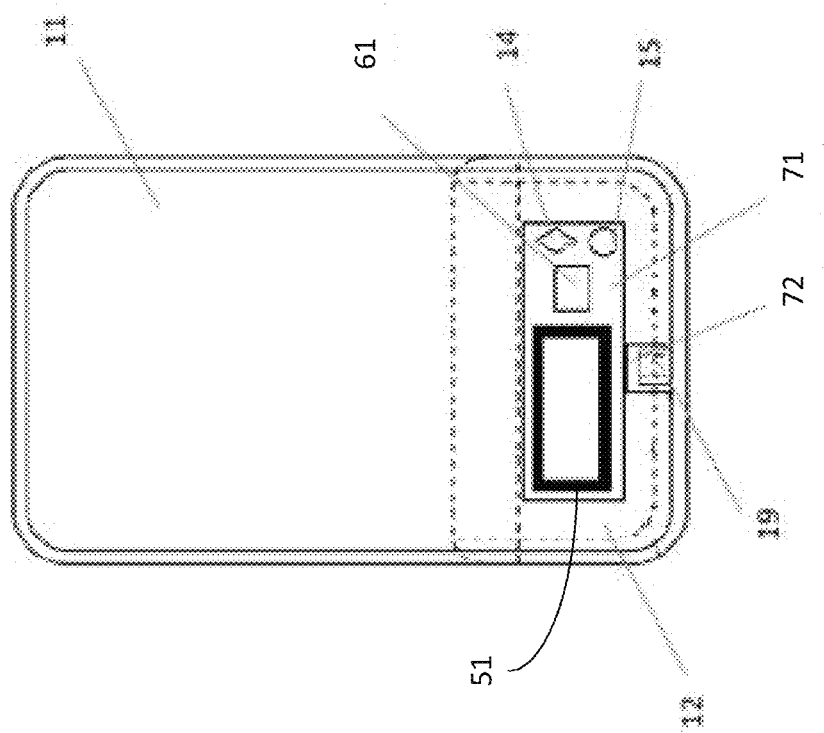
FIG. 2B is a block diagram of various electronic components within a mobile device case with an integral battery.
Figure 2A:
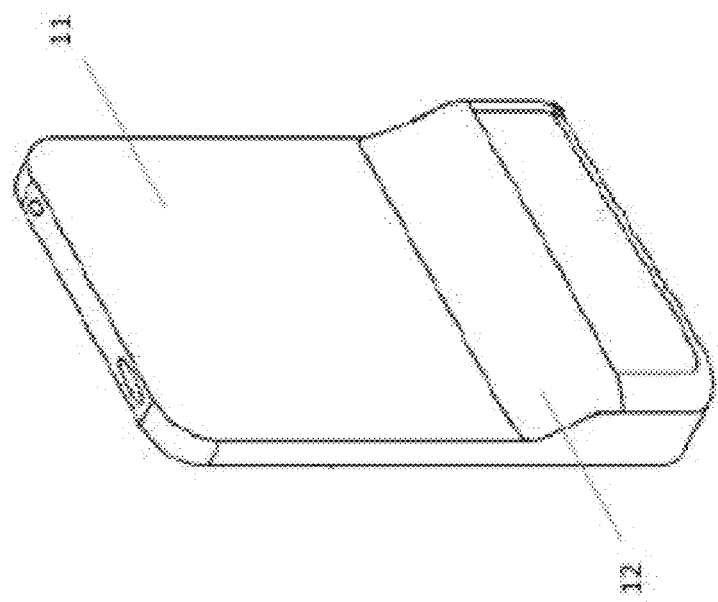
FIG. 2A is a rear view of the case shown in FIG. 1B.

FIG. 2A shows a rear view of an embodiment of a case 11 with an internal battery portion and a base portion 12. FIG. 2B shows an internal view of the base portion 12 illustrating an example embodiment of its internal electrical components. As shown in FIG. 2B, there may be two (or any number of) printed circuit boards (or "PCBs"). In this example, PCB 71 is the main PCB, and it may contain such items as a master control unit ("MCU") or other controller, firmware, an authentication chip, and a battery charging circuit. A second PCB 72 may contain a case connector, such as a 30-pin connector, Lightning connector or other connector. Main PCB 71 connects to the second PCB 72 through a conductive element portion such as a cable, trace or bus. Main PCB 71 is electrically connected to plug 19, which engages the charging port 46 of mobile device 20 (from FIG. 1C) and may transfer electrical charge to and from the rechargeable case battery 51 via PCBs 71 and 72, as well as the mobile device 20.

The mobile device 20 may communicate with case 11 via direct line through the mobile device data and electrical port(s) or wirelessly, via a communications component using a protocol such as Bluetooth or other short-range or near-field communication protocols. In such an embodiment, the case 11 may also contain a communications component such as an antenna 14, radio/transceiver 15 (from FIG. 2B), and any supporting electrical infrastructure.

Although in this example we show direct electrical charging via conductive elements, the rechargeable mobile device case battery 51 may distribute electrical charge to mobile device 20 via induction, piezoelectricity, or other near-field electricity exchange components. In this document, the general term "electrical connection" may refer to direct connection by one or more conductors or indirect connection via inductive elements. In some embodiments, the "case" may be a charging pad or station that can perform a power discharging event when the mobile device is proximate to the "case" such that the mobile device is within an inductive charging range of the "case".

Figure 3B:
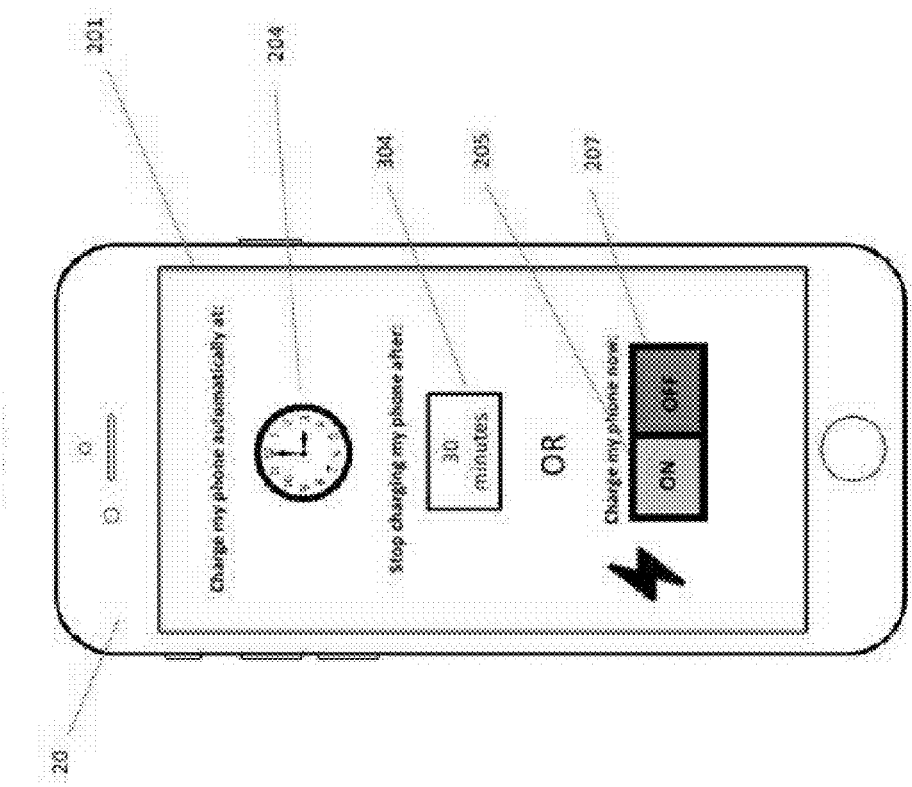
FIG. 3B is a user interface with functions listed.
Figure 3A:
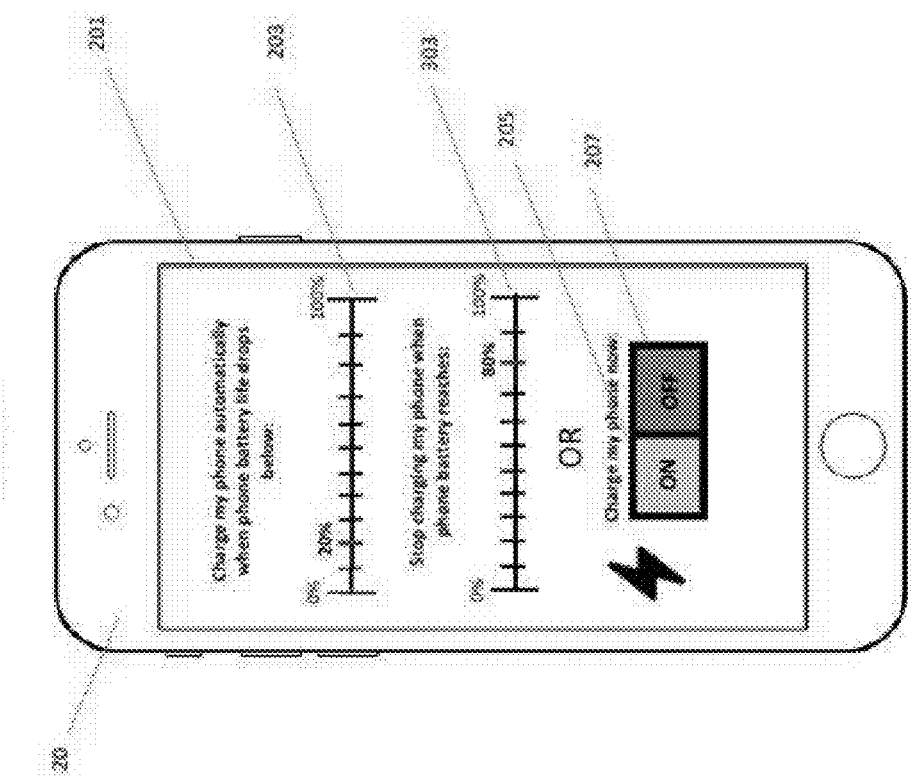
FIG. 3A is a user interface with functions listed.

FIG. 3A shows a user interface 201 that is made up of various sectors of a display device, which includes various data and input fields that the mobile device's processor generates through the execution of various programming instructions. The user interface 201 appears on the display of the mobile device 20 and the application software that enables the mobile device to implement the user interface is managed by the processor of the mobile device 20. The display device of the mobile device may be a touch-sensitive screen, so that the interface 201 includes various fields that a user may activate when the user touches or moves his or her finger on or across the touch-sensitive fields of the screen. The interface 201 includes an input field that allows the user to set a trigger value 203 (indicating a percentage or other unit measure of mobile device battery remaining, or the start or end of a time period. Once the trigger value 203 is reached, the software will automatically cause the processor to command the electrical components of the case to cause the case battery 51 to begin transferring energy to the mobile device 20 when engaged in the case 11 as shown in FIG. 2B. In the embodiment in FIG. 3A, we show a sliding scale for the user to set trigger value 203, but one of ordinary skill in the art can appreciate other ways in which the trigger value may be set, such as a numeric keypad or blank entry field. The user may also set end trigger value 303, that when reached, ends the transfer of electricity from the case battery 51 to the mobile device 20.

The user interface 201 in FIG. 3A also includes one or more input sectors that may alternatively enable the user to bypass or override the trigger value 203, and simply turn the case battery 51 on or off (i.e., connect the case battery to the phone or disconnect the case battery from the mobile device) via an interface power control switch 205. The trigger value 203 or power control switch 205 command the MCU 61 (from FIG. 2B) to route electricity according to a process such as that described below in FIG. 4.

FIG. 3B shows an alternative trigger type which allows for setting a start time 204 at which the system will initiate connection of the case battery 51 to the mobile device 20 and thus begin discharging the case battery 51 into the mobile device, and a stop time 304 at which the system will disconnect the case battery 51 from the mobile device and thus end power distribution from the case 11 to the mobile device 20. The start time and/or stop time may be actual times (such as the start time 204 illustrated in FIG. 3B), or they may be measurements of a time period (such as the stop time 304 illustrated in FIG. 3B) (e.g., 30 minutes from the start time, 30 minutes from the present time, etc.).

Figure 4:
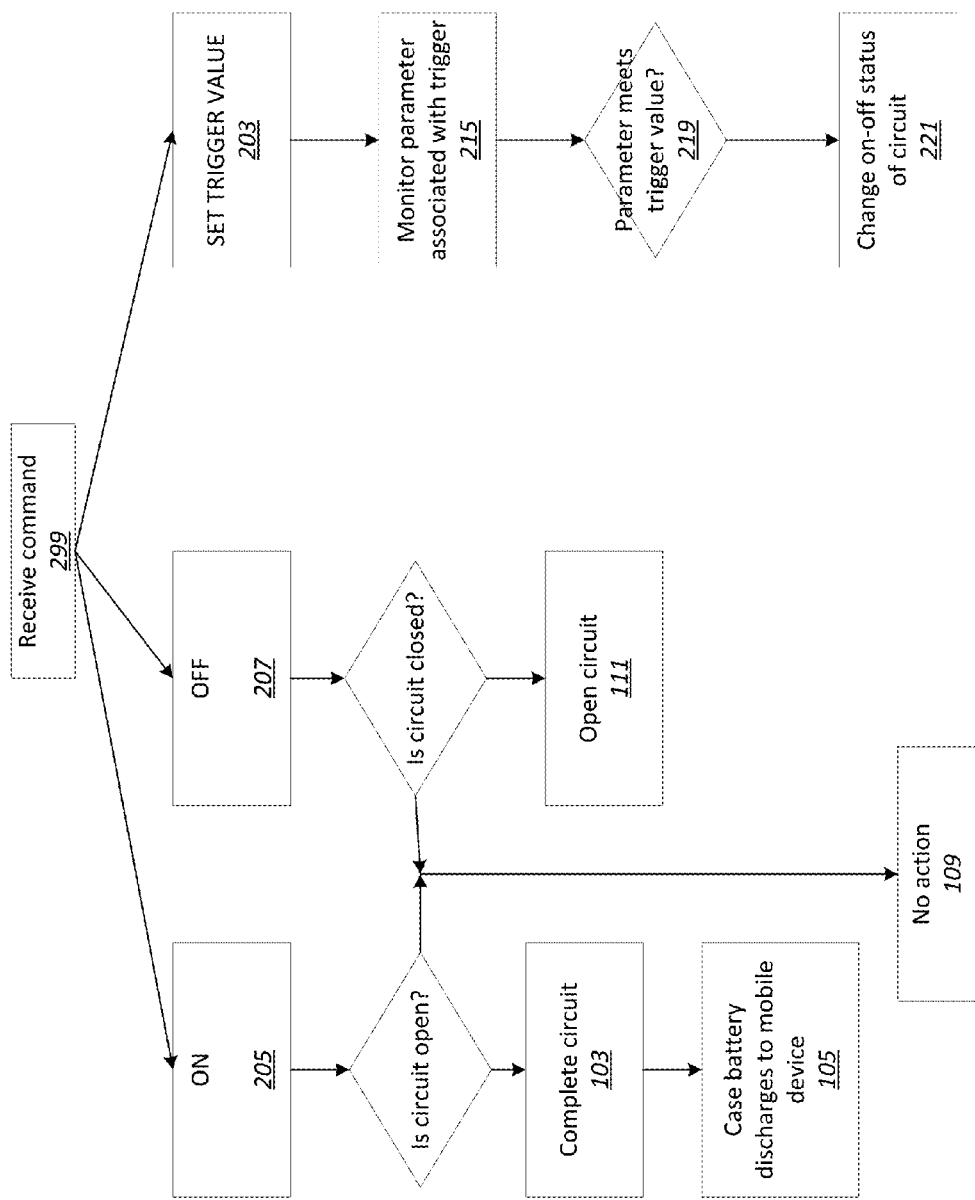
FIG. 4 is a functional diagram of a process that the system may follow to manage battery operation.

FIG. 4 is a diagram of a process that the system may follow to receive data via the user interface and use the data to cause the mobile device case battery to start and stop charging the mobile device. The user interface of the mobile device may provide the user with three options to select: Select On 205, Select Off 207 or Set Trigger 203 (which is activated when a trigger value is set by the user). Additional options, or fewer options, may be available depending on the configuration of the mobile device's software application. The system will receive the command 299 and determine which path to follow depending on the command received.

If a user selects (and the system receives) an On 205 command, the software application will cause the mobile device to issue a command 103 which instructs the MCU of the case to close an electrical circuit between the mobile device battery and the case battery. The result is that the case battery will begin to distribute electrical charge to the mobile device 105. If the User selects Off 207, no action 109 occurs unless the circuit has been completed between the case battery and the mobile device, in which the mobile device will issue a command 111 that causes the MCU of the case to open the circuit and thus stop the case battery from discharging into the mobile device battery.

If the user sets a trigger value 203, the system will receive the trigger value via the user interface and call or otherwise received data from one more sensors of the electronic device or the case to monitor a parameter to determine if the trigger value is reached. For example, if the trigger value is a time or a clock, the sensor may include a clock component that monitors a time and compares the monitored time to the trigger value. As another example, if the trigger value is a battery level, the sensor may include a sensor that monitors mobile device battery level and compares the monitored battery level to the trigger value. Other triggers may be used. In any of these situations, if the trigger value is not met, no action occurs. Optionally, the system may automatically calculate or use default trigger values unless the values are overridden by user input.

Once the system receives a trigger value 203, the application will cause the mobile device to monitor 215 a parameter of the mobile device that corresponds to the trigger value (such as time or mobile device battery life). The mobile device will continue to do this until a value of the monitored parameter meets the trigger value. When the monitored parameter meets the trigger value 219, it will cause the status of the electrical circuit between the mobile device battery and the case battery to change 221 to on (i.e. circuit closed) if the current status is off, or to off (i.e., circuit open) if the current status is on. For example, if the device determines that the monitored battery level of the mobile device is less than or equal to battery level trigger value, the phone may automatically command the MCU 61 (FIG. 2B) to complete the electrical circuit between mobile device 20 and case battery 51. Optionally, the system may complete the circuit via the electrical elements of the first and second PCBs 71 and 72. Case battery 51 will then distribute charge to the mobile device and its battery until the mobile device battery is fully charged or at another threshold value (such as a "stop charge" trigger value). When the user sets a trigger to end charging (303 from FIG. 3A or 304 from FIG. 3B), the device will issue a command to the case MCU 61 to cease distribution of energy from the case battery to the mobile device.

Figure 5:
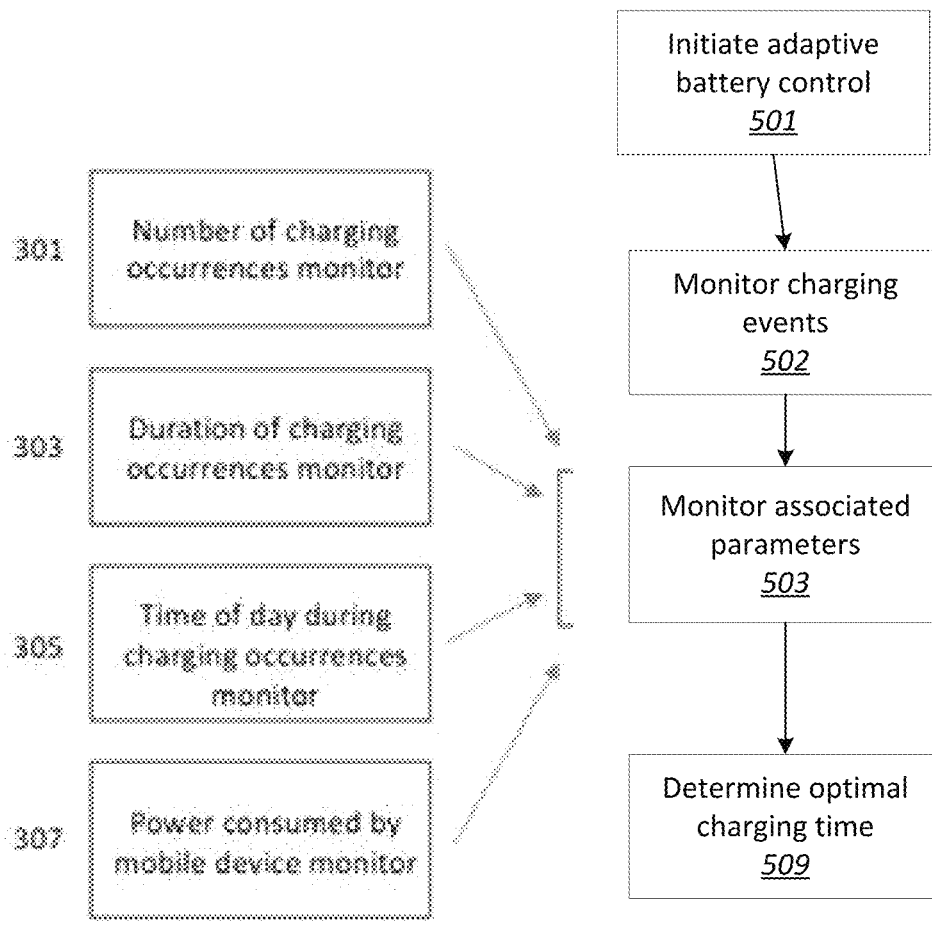
FIG. 5 is a detailed diagram of the process flowing from the "adaptive" command shown in FIG. 4.

Optionally, the system may include an adaptive control function in which the software application causes the mobile device to activate energy distribution from the case battery and stop the distribution at times and durations, and/or upon the occurrence of certain conditions, that are automatically determined by a function of the software application that will be referred to in this document as an adaptive battery controller. Referring to FIG. 5, the system may initiate 501 the adaptive battery control function automatically or in response to a user command via the user interface to start adaptive battery control. Through this function, a battery optimizer module of the software application may cause one or more sensors (such as a battery level sensor, or a sensor that detects the initiation and completion of charging events) of the mobile device and/or case to monitor data 502 relating to charging behavior associated with the mobile device and save the data to a computer-readable memory of the mobile device or the case. As one or more users use the case 11 with a mobile device over a period of time, the battery optimizer module collects and records one or more parameters via one or more sensors such as a number of charging occurrences monitor 301, a clock monitor 303 that the detects the start and stop of charging events and calculates a duration of each charging event as the difference between the start and stop time, a clock monitor 305 (which may or may not include components of the previous monitor) that detects a time of day at which charging events occur, a power consumption monitor 307 that detects and records power consumed by the mobile device. These monitors obtain information relating to the mobile device's (and thus the users's) charging patterns such as the number of charging occurrences, duration of charging occurrences, time of day during charging occurrences, and the amount of power consumed over various time intervals via the internal electronics of case. In various embodiments, this data may be collected at various time intervals such as daily, hourly, or continuously.

The battery optimizer module may use some or all of the data it collects to calculate one or more optimal start times and duration of energy distribution from the mobile device case battery to the mobile device, or one or more optimal mobile device battery level trigger values. The battery optimizer module may implement programming instructions to calculate that the longest duration charges typically occur in the evening, given that the user will often sleep with their mobile device connected to a power source. In this example, based upon historic data collected from the user, the battery optimizer module may determine with high probability that the mobile device and case will be connected to a power source at or around 11:00 p.m. Further, the module may determine that the average charging duration when the mobile device and case are connected to a power source at or around 11:00 p.m., is calculated to be 8 hours. If the user were to trigger 203 at 25% phone battery remaining (as opposed to adaptive battery control function 501), regardless of time of day, when this trigger is reached the case battery 51 will automatically begin charging the mobile device 20. However, this may run the case battery 51 and mobile phone battery through an additional unnecessary partial charging cycle. When adaptive battery control function 501 is active, and the time was 10:45 pm. The phone battery level reached 24%, the battery optimizer module could recognize that the user will typically connect to a power source in 15 minutes at 11:00 p.m. and that the mobile device on average only consumer 1-3% of its battery over this 15 minute period before 11:00 p.m.; thus there is little risk of the mobile device depleting its battery in this 15 minute period. The battery optimizer module would then not distribute charge from the case battery 51 to the mobile device 20 until 11:00 p.m. is reached or closely passed, bypassing unnecessary partial charging cycles, with no impact to the user. If the user does not connect the mobile device 20 and case battery 51 to a power source at or around the typical 11:00 p.m. time of day, the battery optimizer module may still distribute charge once a critically low mobile device battery threshold is reached, such as 10% mobile device battery remaining, to ensure the mobile device 20 remains powered on. The system may use this information as a trigger value in the processes described above. This may reduce the number of charging cycles experienced by the case and mobile device batteries over time, thereby preserving battery integrity and charging capacity. Optionally, the system's user interface may include one or more display and command sectors that may output the calculated trigger value(s) as candidate values and permit the user to review and modify the automatically-set candidate trigger values(s). The system may user the user's response as the actual trigger value(s). Or, if the user fails to respond to the prompt for one or more of the candidate value(s) within a threshold period of time, the system may consider the failure to respond to be a response, and it will use the candidate trigger value (s) as the actual trigger value(s).

Optionally, the system also may associate one or more restrictions (such as maximum or minimum time or charge level) on the trigger values. If so, it will only accept a user-entered trigger value if the user-entered value falls within the parameters of the restriction. Optionally, if a user-entered value does not satisfy a restriction, the system may automatically modify the user-entered value to be the value that is close to the user-entered value but also satisfies the restriction.

Figure 6A:
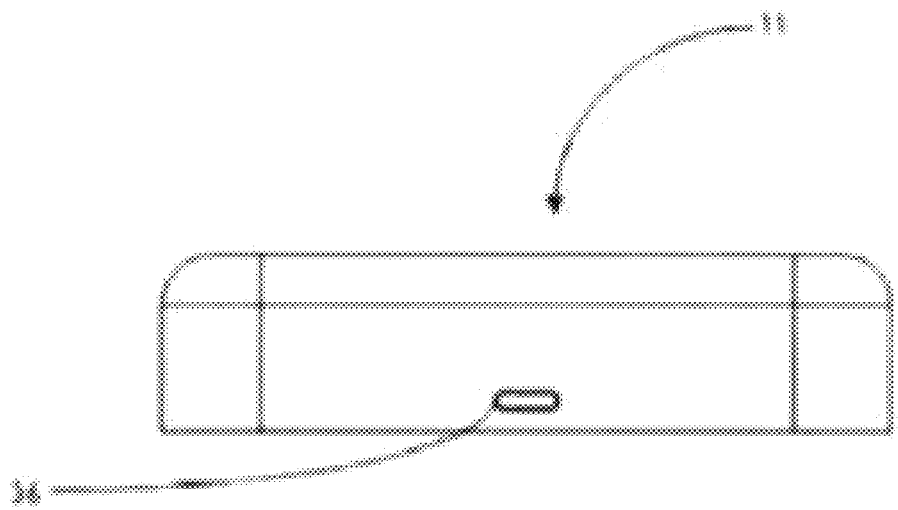
FIG. 6A is a bottom perspective of the case from FIG. 1B.

FIG. 6A illustrates an embodiment in which an inlet jack 36 of case 11 serves as a port to the plug 19 of FIG. 1C. The inlet jack 36 may include a multi-pin or other connector that corresponds to a connector of charging device (such as cable 1003 in FIG. 6B) that may be used to charge mobile device 20 from FIG. 1A. The charging cable 1000 may be configured to plug into a power source, such as a computer, laptop device, car outlet, or a power outlet and the like.

Figure 6B:
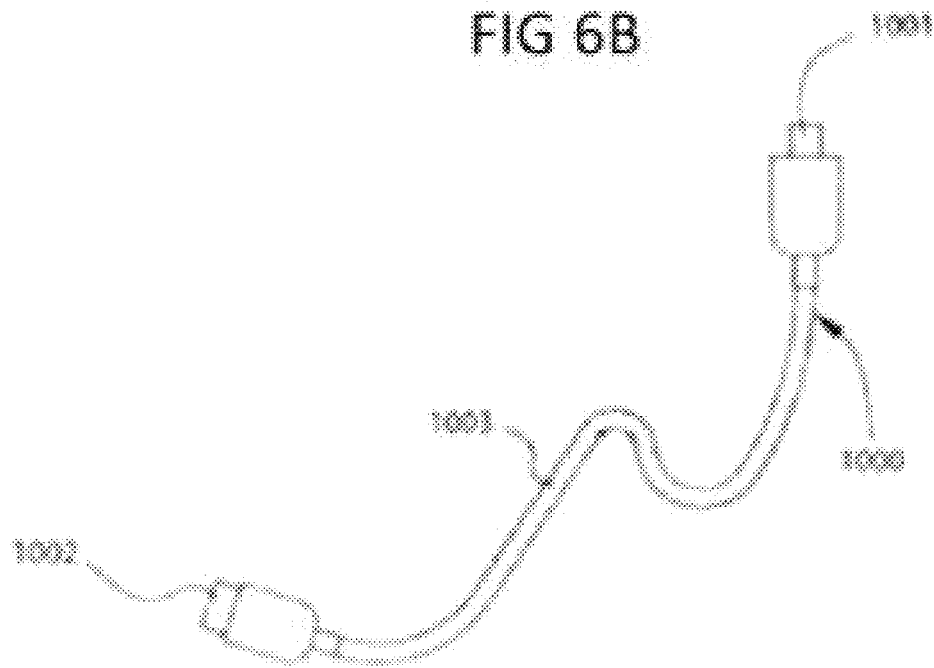
FIG. 6B illustrates a charging or data cable that connects with the case from FIG. 1B.

In FIG. 6B, a data or charging device may comprise any device that may transfer power from a power source to the case 11. In some embodiments, the charging device may be a charging and/or data cable such as charging cable 1000. The charging and/or data cable 1000 may have a male connector 1001, at one end configured to be inserted into the case 11, another male connector 1002 at the other end shaped to connect to a power source, and a wire 1003 joining the connectors 1001, 1002. The charging and/or data cable 1000 may be capable of transferring power and/or data between a power source and/or computing device and a case. Thus, the charging cable may also be a data cable that is configured to connect to the inlet jack 36 and to plug into a computing device and convey charge and data to the case from such computing device.

The charging cable 1000 may be any type of cable having any number of wires that can electronically connect the case 11 to a computing device or power source. In one embodiment, the cable is a USB cable where male connector 1001 is a USB mini-A plug and male connector 1002 is a USB type-B plug.

The software described in the embodiments discussed above may include programming instructions that are provided in a non-transitory, processor-readable memory device that is included within the case 11 and configured to instruct a processor of the mobile device 20, or programming instructions that are embedded in firmware encoded into one or more components of case's electronic components (such as a chip that is electronically connected to the PCBs), or programming instructions that are stored in a non-transitory, processor-readable memory device that is included within the mobile device 20. Optionally, the software may be distributed across any combination of these three items. Thus, when this document uses the term "memory" and "memory device," it includes any embodiments that includes a single device or multiple devices.

Similarly, the commands implemented by the software may be performed by a processor that is embedded in the mobile device, by a processor that is embedded in the mobile device case as an electronic component of such case, or by a combination of the two processors. Thus, when this document uses the terms "processor" and "processing device" it is intended to review to embodiments that employ any number of processors that together perform a function.

Figure 7:
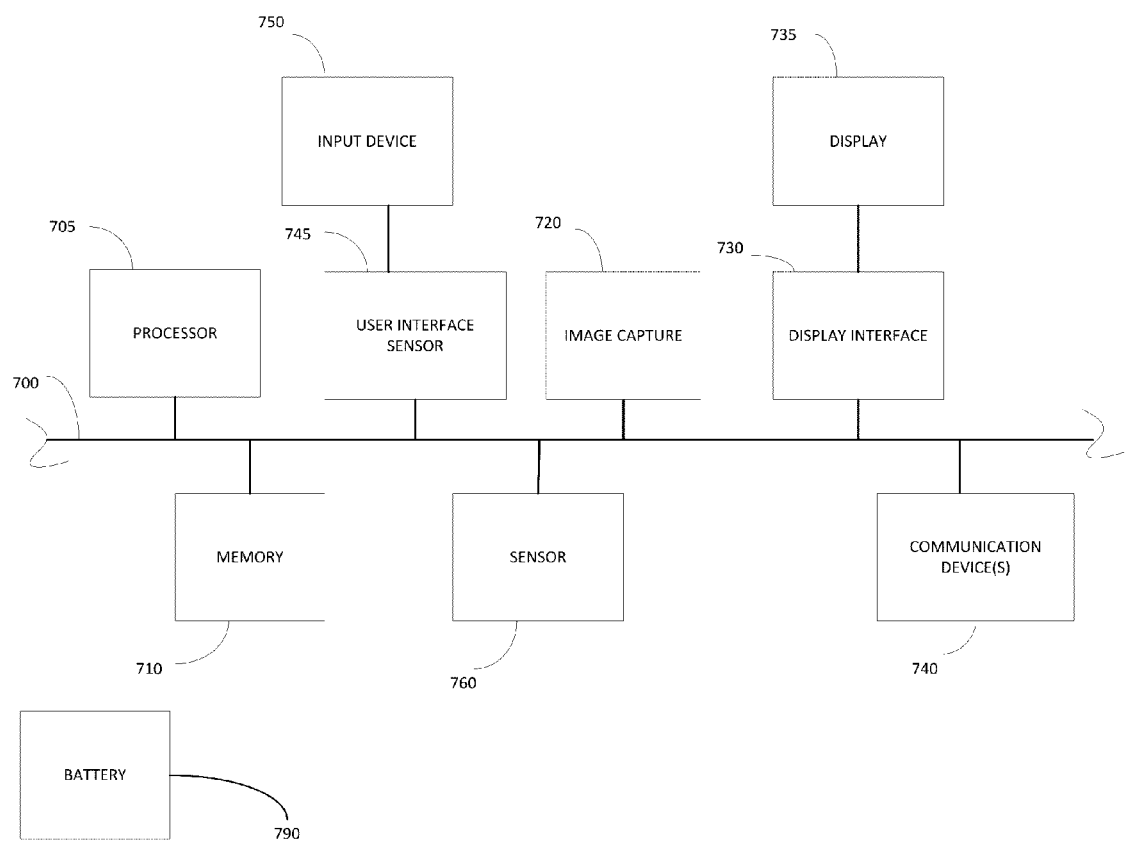
FIG. 7 depicts an example of internal hardware that may be included in a mobile electronic device.

FIG. 7 depicts an example of internal hardware that may be included in the mobile device. An electrical bus 700 serves as an information highway interconnecting the other illustrated components of the hardware. Processor 705 is a central processing device of the system, configured to perform calculations and logic operations required to execute programming instructions. Read only memory (ROM), random access memory (RAM), flash memory, hard drives and other devices capable of storing electronic data constitute examples of memory devices 710. A memory device may include a single device or a collection of devices across which data and/or instructions are stored.

Al display interface 730 may permit information from the bus 700 to be displayed on a display device 745 in visual, graphic or alphanumeric format. As described above, the display device 745 may include one or more sensors that make the display a touch-sensitive display so that it can act as a user interface. An audio interface and audio output (such as a speaker) also may be provided. Communication with external devices may occur using various communication devices 740 such as a transmitter and/or receiver, antenna, an RFID tag and/or short-range or near-field communication circuitry. A communication device 740 may be attached to a communications network, such as the Internet, a local area network or a cellular telephone data network.

The hardware may also include a user interface sensor 745 that allows for receipt of data from additional input devices 750 such as a keyboard, a mouse, a joystick, the touchscreen, a remote control, a pointing device, a video input device and/or an audio input device. Data also may be received from an imaging capturing device 720 such of a scanner or camera. The mobile device may include one or more sensors 760 such as the battery level monitor and/or clock sensor discussed above. Other sensors may include, for example, a positional sensor or motion sensor configured to detect position and movement of the device. As noted above, the mobile device also may include a rechargeable mobile device battery 790 that provides power to the other components described above.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for charging a mobile electronic device, the system comprising:
 a mobile device comprising a processor, a non-transitory memory device, and a rechargeable mobile device battery;
 a case configured to receive the mobile device comprising:
  a rechargeable case battery,
  a controller; and
 programming instructions configured to instruct the processor, when the mobile device is positioned proximate to the case, to:
  identify a first trigger value,
  monitor a parameter of the mobile device to determine when the parameter reaches the first trigger value,
  upon determining that the parameter reaches the first trigger value, issue a command to cause the controller of the case to cause the case battery to discharge energy to the mobile device battery,
  identify a second trigger value,
  monitor the parameter of the mobile device to determine when the parameter reaches the second trigger value, and
  upon determining that the parameter reaches the second trigger value, issue a command to cause the controller of the case to cause the case battery to stop discharging energy to the mobile device battery.

2. The system of claim 1, in which:
 the mobile device further comprises a battery level sensor;
 the first trigger value and the parameter each comprise a battery level; and
 determining that the parameter reaches the first trigger value comprises determining that the battery level of the mobile device equals or has crossed a threshold associated with the first trigger value.

3. The system of claim 1, in which:
 the mobile device further comprises a battery level sensor;
 the first trigger value and the parameter each comprise a battery level;
 determining that the parameter reaches the first trigger value comprises determining that the battery level of the mobile device equals or has crossed a threshold associated with the first trigger value;
 the second trigger value also comprises a battery level; and
 determining that the parameter reaches the second trigger value comprises determining that the battery level of the mobile device value equals or has crossed a threshold associated with the second trigger value.

4. The system of claim 1, in which:
 the mobile device further comprises a clock sensor;
 the first trigger value and the parameter each comprise a start time; and
 determining that the parameter reaches the first trigger value comprises determining that a time as measured by the clock sensor equals or has crossed a threshold associated with the first trigger value.

5. The system of claim 1, in which:
 the mobile device further comprises a clock sensor;
 the first trigger value and the parameter each comprise a start time;
 determining that the parameter reaches the first trigger value comprises determining that a time as measured by the clock sensor equals or has crossed a threshold associated with the first trigger value;
 the second trigger value comprises a duration or stop time; and
 determining that the parameter reaches the second trigger value comprises determining that a time as measured by the clock sensor equals or has crossed a threshold associated with the second trigger value.

6. The system of claim 1, wherein:
 the mobile device further comprises a touch-sensitive display device; and
 the programming instructions are further configured to instruct the processor to output, via the touch-sensitive display device, a user interface that includes input sectors configured to prompt a user to enter the first trigger value or the second trigger value, and to receive the first trigger value or the second trigger value in response to the prompt.

7. The system of claim 1, wherein the programming instructions are further configured to instruct the processor to:
 monitor a start time and stop time, or a duration, for each of a plurality of charging events of the case battery;
 monitor one or more parameters of the mobile device that correspond to each monitored charging event;
 store the monitored start and stop times or durations, and the corresponding parameters for each charging event; and use the monitored start and stop times or durations, and corresponding parameters for each charging event to determine the first trigger value.

8. The system of claim 7, wherein:
the mobile device further comprises a touch-sensitive display device; and
the programming instructions are further configured to instruct the processor to:
after using the monitored start and stop times or durations, and the corresponding parameters for each charging event, to determine the first trigger value, cause the display device to output the determined first trigger value as a candidate trigger value,
output, via an input field sector of the touch-sensitive display device, a prompt configured to prompt a user to confirm or modify the candidate trigger value, and
use a user response to the prompt as the first trigger value.

9. A method for transferring electrical charge from a device case to a mobile electronic device, the method comprising:
by a processor of a mobile electronic device that is positioned within a case that includes a case battery:
identifying a first trigger value,
by a sensor of the mobile electronic device, monitoring a parameter of the mobile electronic device to determine when the parameter reaches the first trigger value,
upon determining that the parameter reaches the first trigger value, issuing a command to cause a controller of the case to cause the case battery to discharge energy to the mobile electronic device,
identifying a second trigger value,
monitoring the parameter of the mobile device to determine when the parameter reaches the second trigger value, and
upon determining that the parameter reaches the second trigger value, issuing a command to cause the controller of the case to cause the case battery to stop discharging energy to the mobile device battery.

10. The method of claim 9, in which:
the mobile device further comprises a battery level sensor;
the first trigger value and the parameter each comprise a battery level; and
determining that the parameter reaches the first trigger value comprises determining that the battery level of the mobile device equals or has crossed a threshold associated with the first trigger value.

11. The method of claim 9, in which:
the mobile device further comprises a battery level sensor;
the first trigger value and the parameter each comprise a battery level;
determining that the parameter reaches the first trigger value comprises determining that the battery level of the mobile device equals or has crossed a threshold associated with the first trigger value;
the second trigger value also comprises a battery level; and
determining that the parameter reaches the second trigger value comprises determining that the battery level of the mobile device value equals or has crossed a threshold associated with the second trigger value.

12. The method of claim 9, in which:
the mobile device further comprises a clock sensor;
the first trigger value and the parameter each comprise a start time; and
determining that the parameter reaches the first trigger value comprises determining that a time as measured by the clock sensor equals or has crossed a threshold associated with the first trigger value.

13. The method of claim 9, in which:
the mobile device further comprises a clock sensor;
the first trigger value and the parameter each comprise a start time;
determining that the parameter reaches the first trigger value comprises determining that a time as measured by the clock sensor equals or has crossed a threshold associated with the first trigger value;
the second trigger value comprises duration or stop time; and
determining that the parameter reaches the second trigger value comprises determining that a time as measured by the clock sensor equals or has crossed a threshold associated with the second trigger value.

14. The method of claim 9, wherein the method further comprises, by the processor:
causing a touch-sensitive display device of the mobile device to output a user interface that includes input sectors configured to prompt a user to enter the first trigger value or the second trigger value; and
receiving the first trigger value or the second trigger value in response to the prompt.

15. The method of claim 9, further comprising, by the processor:
monitoring a start time and stop time, or a duration, for each of a plurality of charging events of the case battery;
monitoring one or more parameters of the mobile device that correspond to each monitored charging event;
storing the monitored start and stop times or durations, and the corresponding parameters for each charging event in a computer-readable memory device; and
using the monitored start and stop times or durations, and corresponding parameters for each charging event to determine the first trigger value.

16. The method of claim 15, wherein the method further comprises, after using the monitored start and stop times or durations, and the corresponding parameters for each charging event, to determine the first trigger value:
causing a touch-sensitive display of the mobile device to output the determined first trigger value as a candidate trigger value,
causing the touch-sensitive display to output, via an input field sector of the touch-sensitive display device, a prompt configured to prompt a user to confirm or modify the candidate trigger value,
receiving a user response to the prompt, and
replacing the determined first trigger value with the received response.

17. A system for charging a mobile electronic device, the system comprising:
a mobile device comprising a processor, a non-transitory memory device, a rechargeable mobile device battery and a battery level sensor;
a case configured to receive the mobile device comprising:
a rechargeable case battery,
a controller; and
programming instructions configured to instruct the processor, when the mobile device is positioned proximate to the case, to:
identify a first trigger value comprising a battery level, monitor a parameter of the mobile device, wherein the parameter comprises a battery level,
determine when the parameter reaches the first trigger value based on at least determining when the battery level of the mobile device equals or has crossed a threshold associated with the first trigger value, and
upon determining that the parameter reaches the first trigger value, issue a command to cause the controller of the case to cause the case battery to discharge energy to the mobile device battery.

18. The system of claim 17, in which:
the mobile device further comprises a clock sensor;
the first trigger value and the parameter each comprise a start time; and
determining that the parameter reaches the first trigger value comprises determining that a time as measured by the clock sensor equals or has crossed a threshold associated with the first trigger value.

19. The system of claim 17, wherein:
the mobile device further comprises a touch-sensitive display device; and
the programming instructions are further configured to instruct the processor to output, via the touch-sensitive display device, a user interface that includes input sectors configured to prompt a user to enter the first trigger value, and to receive the first trigger value in response to the prompt.

20. The system of claim 17, wherein the programming instructions are further configured to instruct the processor to:
monitor a start time and stop time, or a duration, for each of a plurality of charging events of the case battery;
monitor one or more parameters of the mobile device that correspond to each monitored charging event;
store the monitored start and stop times or durations, and the corresponding parameters for each charging event; and
use the monitored start and stop times or durations, and corresponding parameters for each charging event to determine the first trigger value.

21. The system of claim 20, wherein:
the mobile device further comprises a touch-sensitive display device; and
the programming instructions are further configured to instruct the processor to:
after using the monitored start and stop times or durations, and the corresponding parameters for each charging event, to determine the first trigger value, cause the display device to output the determined first trigger value as a candidate trigger value,
output, via an input field sector of the touch-sensitive display device, a prompt configured to prompt a user to confirm or modify the candidate trigger value, and
use a user response to the prompt as the first trigger value.

22. A method for transferring electrical charge from a device case to a mobile electronic device, the method comprising:
by a processor of a mobile electronic device that is positioned within a case that includes a case battery:
identifying a first trigger value comprising a battery level,
by a battery level sensor of the mobile electronic device, monitoring a parameter of the mobile electronic device, the parameter comprising a battery level,
determine when the parameter reaches the first trigger value based on at least determining that the battery level of the mobile device equals or has crossed a threshold associated with the first trigger value, and
upon determining that the parameter reaches the first trigger value, issuing a command to cause a controller of the case to cause the case battery to discharge energy to the mobile electronic device.

23. The method of claim 22, in which:
the mobile device further comprises a clock sensor;
the first trigger value and the parameter each comprises a start time; and
determining that the parameter reaches the first trigger value comprises determining that a time as measured by the clock sensor equals or has crossed a threshold associated with the first trigger value.

24. The method of claim 22, wherein the method further comprises, by the processor:
causing a touch-sensitive display device of the mobile device to output a user interface that includes input sectors configured to prompt a user to enter the first trigger value; and
receiving the first trigger value in response to the prompt.

25. The method of claim 22, further comprising, by the processor:
monitoring a start time and stop time, or a duration, for each of a plurality of charging events of the case battery;
monitoring one or more parameters of the mobile device that correspond to each monitored charging event;
storing the monitored start and stop times or durations, and the corresponding parameters for each charging event in a computer-readable memory device; and
using the monitored start and stop times or durations, and corresponding parameters for each charging event to determine the first trigger value.

26. The method of claim 25, wherein the method further comprises, after using the monitored start and stop times or durations, and the corresponding parameters for each charging event, to determine the first trigger value:
causing a touch-sensitive display of the mobile device to output the determined first trigger value as a candidate trigger value;
causing the touch-sensitive display to output, via an input field sector of the touch-sensitive display device, a prompt configured to prompt a user to confirm or modify the candidate trigger value;
receiving a user response to the prompt; and
replacing the determined first trigger value with the received response.

27. A system for charging a mobile electronic device, the system comprising:
a mobile device comprising a processor, a non-transitory memory device, a rechargeable mobile device battery and a clock sensor;
a case configured to receive the mobile device comprising:
a rechargeable case battery,
a controller; and
programming instructions configured to instruct the processor, when the mobile device is positioned proximate to the case, to:
identify a first trigger value comprising a start time,
monitor a parameter of the mobile device, wherein the parameter comprises a start time,
determine when the parameter reaches the first trigger value based on at least determining when a time as measured by the clock sensor equals or has crossed a threshold associated with the first trigger value, and upon determining that the parameter reaches the first trigger value, issue a command to cause the controller of the case to cause the case battery to discharge energy to the mobile device battery.

28. The system of claim 27, wherein:

the mobile device further comprises a touch-sensitive display device; and the programming instructions are further configured to instruct the processor to output, via the touch-sensitive display device, a user interface that includes input sectors configured to prompt a user to enter the first trigger value, and to receive the first trigger value in response to the prompt.

29. The system of claim 27, wherein the programming instructions are further configured to instruct the processor to:

monitor a start time and stop time, or a duration, for each of a plurality of charging events of the case battery;

monitor one or more parameters of the mobile device that correspond to each monitored charging event;

store the monitored start and stop times or durations, and the corresponding parameters for each charging event; and use the monitored start and stop times or durations, and corresponding parameters for each charging event to determine the first trigger value.

30. The system of claim 29, wherein:

the mobile device further comprises a touch-sensitive display device; and the programming instructions are further configured to instruct the processor to:

after using the monitored start and stop times or durations, and the corresponding parameters for each charging event, to determine the first trigger value, cause the display device to output the determined first trigger value as a candidate trigger value, output, via an input field sector of the touch-sensitive display device, a prompt configured to prompt a user to confirm or modify the candidate trigger value, and use a user response to the prompt as the first trigger value.

31. A method for transferring electrical charge from a device case to a mobile electronic device, the method comprising:

by a processor of a mobile electronic device that is positioned within a case that includes a case battery:

identifying a first trigger value comprising a start time, by a clock sensor of the mobile electronic device, monitoring a parameter of the mobile electronic device, wherein the parameter comprises a start time, determining when the parameter reaches the first trigger value based on at least when a time as measured by the clock sensor equals or has crossed a threshold associated with the first trigger value, and upon determining that the parameter reaches the first trigger value, issuing a command to cause a controller of the case to cause the case battery to discharge energy to the mobile electronic device.

32. The method of claim 31, wherein the method further comprises, by the processor:

causing a touch-sensitive display device of the mobile device to output a user interface that includes input sectors configured to prompt a user to enter the first trigger value; and receiving the first trigger value in response to the prompt.

33. The method of claim 31, further comprising, by the processor:

monitoring a start time and stop time, or a duration, for each of a plurality of charging events of the case battery;

monitoring one or more parameters of the mobile device that correspond to each monitored charging event;

storing the monitored start and stop times or durations, and the corresponding parameters for each charging event in a computer-readable memory device; and using the monitored start and stop times or durations, and corresponding parameters for each charging event to determine the first trigger value.

34. The method of claim 31, wherein the method further comprises, after using the monitored start and stop times or durations, and the corresponding parameters for each charging event, to determine the first trigger value:

causing a touch-sensitive display of the mobile device to output the determined first trigger value as a candidate trigger value;

causing the touch-sensitive display to output, via an input field sector of the touch-sensitive display device, a prompt configured to prompt a user to confirm or modify the candidate trigger value;

receiving a user response to the prompt; and replacing the determined first trigger value with the received response.

35. A system for charging a mobile electronic device, the system comprising:

a mobile device comprising a processor, a non-transitory memory device, and a rechargeable mobile device battery;

a case configured to receive the mobile device comprising:

a rechargeable case battery, a controller; and programming instructions configured to instruct the processor, when the mobile device is positioned proximate to the case, to:

identify a first trigger value by:

monitoring a start time and stop time, or a duration, for each of a plurality of charging events of the case battery, monitoring one or more parameters of the mobile device that correspond to each monitored charging event, storing the monitored start and stop times or durations, and the corresponding parameters for each charging event, and using the monitored start and stop times or durations, and corresponding parameters for each charging event to determine the first trigger value, monitor a parameter of the mobile device to determine when the parameter reaches the first trigger value, and upon determining that the parameter reaches the first trigger value, issue a command to cause the controller of the case to cause the case battery to discharge energy to the mobile device battery.

36. The system of claim 35, wherein:

the mobile device further comprises a touch-sensitive display device; and the programming instructions are further configured to instruct the processor to:

after using the monitored start and stop times or durations, and the corresponding parameters for each charging event, to determine the first trigger value, cause the display device to output the determined first trigger value as a candidate trigger value, output, via an input field sector of the touch-sensitive display device, a prompt configured to prompt a user to confirm or modify the candidate trigger value, and use a user response to the prompt as the first trigger value.

37. The system of claim 35, further comprising additional programming instructions configured to cause the processor to:

identify a second trigger value;

monitor the parameter of the mobile device to determine when the parameter reaches the second trigger value; and upon determining that the parameter reaches the second trigger value, issue a command to cause the controller of the case to cause the case battery to stop discharging energy to the mobile device battery.

38. The system of claim 37, in which:

the mobile device further comprises a battery level sensor;

the first trigger value and the parameter each further comprises a battery level;

determining that the parameter reaches the first trigger value further comprises determining that the battery level of the mobile device equals or has crossed a threshold associated with the first trigger value;

the second trigger value also comprises a battery level; and determining that the parameter reaches the second trigger value comprises determining that the battery level of the mobile device value equals or has crossed a threshold associated with the second trigger value.

39. The system of claim 37, in which:

the mobile device further comprises a clock sensor;

the first trigger value and the parameter each further comprises a start time;

determining that the parameter reaches the first trigger value further comprises determining that a time as measured by the clock sensor equals or has crossed a threshold associated with the first trigger value;

the second trigger value comprises a duration or stop time; and determining that the parameter reaches the second trigger value comprises determining that a time as measured by the clock sensor equals or has crossed a threshold associated with the second trigger value.

40. The system of claim 35, wherein:

the mobile device further comprises a touch-sensitive display device; and the programming instructions are further configured to instruct the processor to output, via the touch-sensitive display device, a user interface that includes input sectors configured to prompt a user to enter the first trigger value, and to receive the first trigger value in response to the prompt.

41. A method for transferring electrical charge from a device case to a mobile electronic device, the method comprising:

by a processor of a mobile electronic device that is positioned within a case that includes a case battery:

identifying a first trigger value by:

monitoring a start time and stop time, or a duration, for each of a plurality of charging events of the case battery, monitoring one or more parameters of the mobile device that correspond to each monitored charging event, storing the monitored start and stop times or durations, and the corresponding parameters for each charging event in a computer-readable memory device, and using the monitored start and stop times or durations, and corresponding parameters for each charging event to determine the first trigger value, by a sensor of the mobile electronic device, monitoring a parameter of the mobile electronic device to determine when the parameter reaches the first trigger value, and upon determining that the parameter reaches the first trigger value, issuing a command to cause a controller of the case to cause the case battery to discharge energy to the mobile electronic device.

42. The method of claim 41, wherein the method further comprises, after using the monitored start and stop times or durations, and the corresponding parameters for each charging event, to determine the first trigger value:

causing a touch-sensitive display of the mobile device to output the determined first trigger value as a candidate trigger value;

causing the touch-sensitive display to output, via an input field sector of the touch-sensitive display device, a prompt configured to prompt a user to confirm or modify the candidate trigger value;

receiving a user response to the prompt; and replacing the determined first trigger value with the received response.

43. The method of claim 41, further comprising, by the processor of the mobile device:

identifying a second trigger value;

monitoring the parameter of the mobile device to determine when the parameter reaches the second trigger value; and upon determining that the parameter reaches the second trigger value, issuing a command to cause the controller of the case to cause the case battery to stop discharging energy to the mobile device battery.

44. The method of claim 43, in which:

the mobile device further comprises a battery level sensor;

the first trigger value and the parameter each comprises a battery level;

determining that the parameter reaches the first trigger value comprises determining that the battery level of the mobile device equals or has crossed a threshold associated with the first trigger value;

the second trigger also comprises a battery level; and determining that the parameter reaches the second trigger value comprises determining that the battery level of the mobile device value equals or has crossed a threshold associated with the second trigger value.

45. The method of claim 43, in which:

the mobile device further comprises a clock sensor;

the first trigger value and the parameter each comprises a start time;

determining that the parameter reaches the first trigger value comprises determining that a time as measured by the clock sensor equals or has crossed a threshold associated with the first trigger value;

the second trigger value comprises a duration or stop time; and determining that the parameter reaches the second trigger value comprises determining that a time as measured by the clock sensor equals or has crossed a threshold associated with the second trigger value.

46. The method of claim 41, wherein the method further comprises, by the processor:
  causing a touch-sensitive display device of the mobile device to output a user interface that includes input sectors configured to prompt a user to enter the first trigger value; and
  receiving the first trigger value in response to the prompt.

\* \* \* \* \*